(12) United States Patent
Li

(10) Patent No.: US 10,740,707 B2
(45) Date of Patent: Aug. 11, 2020

(54) SYSTEMS AND METHODS FOR PREFORMING TASK USING SIMPLE CODE

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 1136 days.

(21) Appl. No.: 15/095,083

(22) Filed: Apr. 10, 2016

(65) Prior Publication Data

US 2016/0300168 A1 Oct. 13, 2016

Related U.S. Application Data

(60) Provisional application No. 62/146,240, filed on Apr. 10, 2015.

(51) Int. Cl.
*G06Q 10/00* (2012.01)
*G06Q 10/06* (2012.01)
*G06F 16/9535* (2019.01)

(52) U.S. Cl.
CPC ... *G06Q 10/06311* (2013.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 5,875,431 A * | 2/1999 | Heckman | | G06Q 10/04 705/7.16 |
| 6,141,662 A * | 10/2000 | Jeyachandran | | G06F 16/168 |
| 7,130,885 B2 * | 10/2006 | Chandra | | G06Q 10/10 709/206 |
| 7,139,718 B2 * | 11/2006 | Jeyachandran | .. | G06Q 10/06311 705/7.21 |
| 7,818,372 B1 * | 10/2010 | Cutrell | | G06Q 10/00 370/260 |
| 8,874,477 B2 * | 10/2014 | Hoffberg | | G06Q 10/0631 705/37 |
| 2001/0051887 A1 * | 12/2001 | Jeyachandran | .. | G06Q 10/06311 705/7.21 |
| 2002/0042718 A1 * | 4/2002 | Jett | | G06O 20/20 705/64 |
| 2002/0049727 A1 * | 4/2002 | Rothkopf | | G06F 16/9535 |
| 2002/0065828 A1 * | 5/2002 | Goodspeed | | G06F 16/9566 |
| 2002/0138582 A1 * | 9/2002 | Chandra | | G06Q 10/10 709/206 |
| 2002/0199187 A1 * | 12/2002 | Gissin | | G06F 3/0481 725/32 |
| 2003/0030663 A1 * | 2/2003 | Wakai | | G06Q 10/107 715/743 |
| 2004/0093261 A1 * | 5/2004 | Jain | | G06Q 10/10 705/7.32 |
| 2004/0210661 A1 * | 10/2004 | Thompson | | G06Q 30/02 709/228 |

(Continued)

*Primary Examiner* — Gurkanwaljit Singh

(57) ABSTRACT

Systems and methods for performing task using a simple code. Combination of unique marker and simple code is arranged to represent multiple tasks which belong to one or multiple applicants. In practice, after a user enters a code, a list of tasks shows up on screen for selection. Past tasks are arranged retrievable for marker and code combination. Task is also searchable via query containing related information. Some tasks which have the same nature are assigned the same code for use at different places.

20 Claims, 9 Drawing Sheets

(56) References Cited

U.S. PATENT DOCUMENTS

| | | | |
|---|---|---|---|
| 2007/0121152 A1* | 5/2007 | Cupchoy | G06F 17/248 358/1.15 |
| 2007/0168870 A1* | 7/2007 | Wada | G11B 20/00086 715/741 |
| 2008/0183532 A1* | 7/2008 | Barnard | G06Q 10/063 705/7.14 |
| 2008/0303811 A1* | 12/2008 | Van Luchene | A63F 13/12 345/419 |
| 2010/0269049 A1* | 10/2010 | Fearon | G06Q 10/109 715/744 |
| 2010/0293108 A1* | 11/2010 | Gurvitch | G06Q 40/04 705/36 R |
| 2013/0073398 A1* | 3/2013 | Levy | G06Q 30/0241 705/14.72 |

* cited by examiner

Step 1: Social circle interface. User taps button 28.

Smartphone 26

Task Button 28

Step 2: Task window shows up. Marker info is obtained.

Smartphone 26

Step 3: User keys in a code. Info is sent to service center.

Smartphone 26

Step 4: Phone starts calling.

Smartphone 26

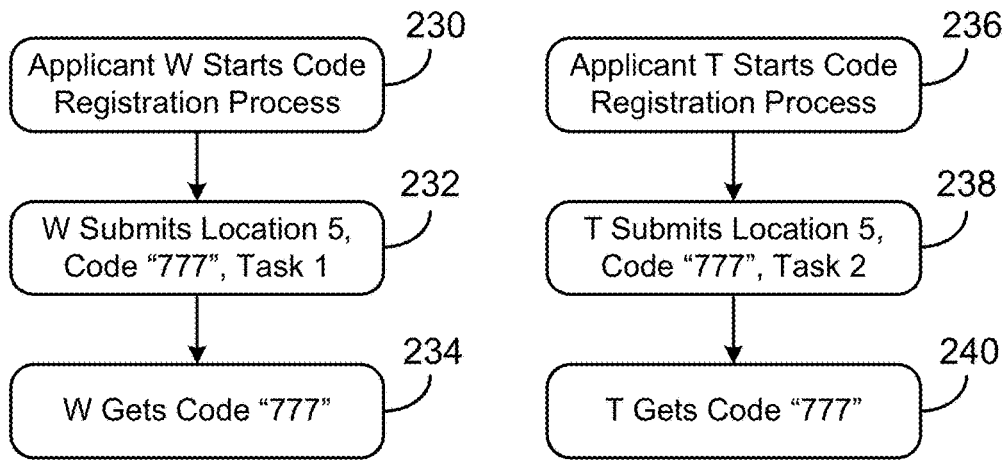
FIG. 11-A
FIG. 11-B
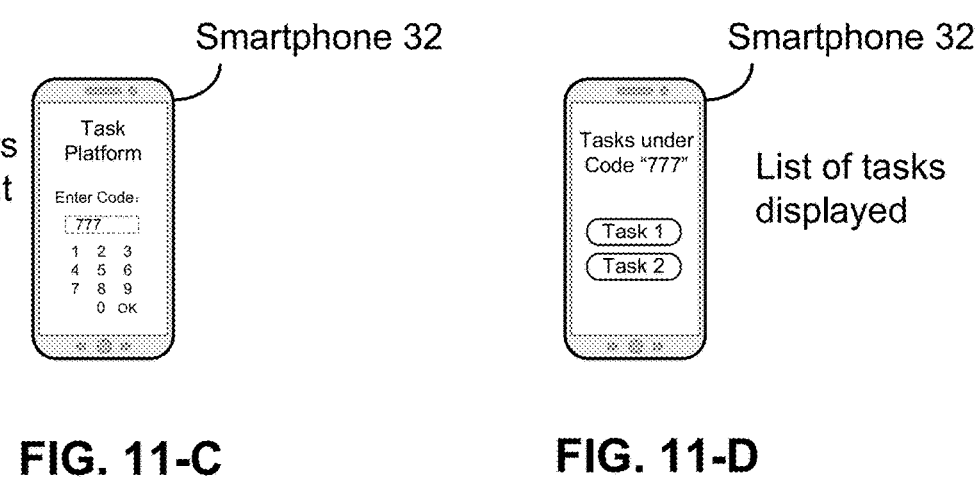
FIG. 11-C
FIG. 11-D

SYSTEMS AND METHODS FOR PREFORMING TASK USING SIMPLE CODE

CROSS REFERENCE TO RELATED APPLICATION

This application is entitled to the benefit of Provisional Patent Application Ser. No. 62/146,240, filed Apr. 10, 2015. This application is also related to U.S. patent application Ser. No. 14/961,901, filed Dec. 8, 2015, and entitled "Systems and Methods for Performing Task Using Simple Code".

FEDERALLY SPONSORED RESEARCH

Not applicable

SEQUENCE LISTING OR PROGRAM

Not applicable

BACKGROUND

Field of Invention

This invention relates to executing a task electronically, more particularly to executing a task, such as accessing online info or making phone call, using a simple code.

Description of Prior Art

To reach a business or organization, we may make a phone call or go to its website. A phone call usually requires entering a phone number, and access of a website requires input of a website address, or uniform resource locator (URL). For many users, dialing an unfamiliar ten-digit number is a demanding experience. On the other hand, keying in a URL's long string of letter and sign at a device, especially at a smartphone with a small virtual keyboard, is even worse, which may become inconvenient, frustrating, and unwelcome. In fact, people tend to avoid doing it whenever possible. Another contact method involves code scan using, for instance, a phone camera with a specific software program. For example, there are certain products and printed materials which carry a quick response (QR) code. QR code is a two-dimensional barcode which may contain URL and other information. After a QR code is scanned by a smart phone, with appropriate algorithm, the phone may be directed to a website determined by the QR code. The phone may access and download information from there, and then display a webpage. In the process, scanning causes opening of a webpage automatically and there is no need for a user to enter anything by finger. However, although a QR code brings some convenience, scanning a code itself is still awkward and bothersome. For instance, a user may have to hold a smartphone firmly, aim at a code precisely, and then wait for a qualified scan to take place. The scan process requires time, some skill, and patience, which is not well accepted by some users.

Therefore, there exists a need for contacting method which is easy, simple, and convenient.

Advertisement presented on television, in radio, on magazine, newspaper, or billboard contains important contact information, such as a phone number and web address with a URL. The number or address, new and intimidating, has to be memorized temporarily and most likely would be used only once. For most people, remembering a phone number or a string of letter is not an easy task. In fact it is a challenge, in particular when a number is briefly shown on television screen or announced on the air only once or twice. Even if a phone number or web address could be memorized, entering it, as discussed in the above, is still a burden and nuisance. As a consequence, contacting a business, which is highly desirable by businesses and promoted in advertisement, in a costly way many a time, is actually hindered by advertisement itself, i.e., by a long phone number and long string of letters and signs.

Therefore, for advertisement, there also exists a need for contacting method which is easy, simple, and convenient.

Since making phone call and logging on a website are executable tasks for certain electronic devices, such as smartphone, aforementioned needs may be categorized as a need for performing a task. There exists a need for performing a task in an easy, simple, and convenient way.

Objects and Advantages

Accordingly, several main objects and advantages of the present invention are:

a). to provide improved methods and systems for performing a task;
b). to provide such methods and systems which use marker and code combination to represent multiple tasks or action items;
c). to provide such methods and systems which present multiple tasks for a user to choose from;
d). to provide such methods and systems which use interface of a social networking platform to start launching a task;
e). to provide such methods and systems which enable an applicant to bundle a code, marker, and task together;
f). to provide such methods and systems which provide a bidding process for an applicant to win the right to use a code or share a code;
g). to provide such methods and systems which assign a code to similar tasks for applicants at different locations;
h). to provide such methods and systems which charge an advertiser fees based partially on usage of code by users;
i). to provide such methods and systems which enable a task searching function via a query related to code, marker, and task; and
j). to provide such methods and systems which retrieve past tasks based on marker and code combination.

Further objects and advantages will become apparent from a consideration of the drawings and ensuing description.

SUMMARY

In accordance with the present invention, methods and systems are proposed for performing a task in a simple and easy manner. The key is of simple code which, when bundled with a marker, is arranged to represent multiple tasks. A user may enter a code at a device, review a list of tasks presented on screen, and then select one to execute it. In addition, tasks that were assigned to code and marker combination in the past are retrievable. For convenience, similar tasks at multiple places may use one code. Code app or code function may be arranged accessible at interface of social networking platform. Task is also arranged searchable via query related to code, marker, and task.

DRAWING FIGURES

Figure 7:
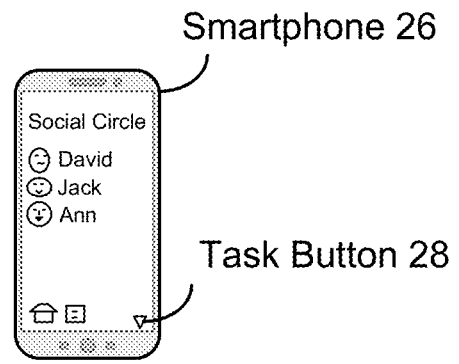
Figure 7:
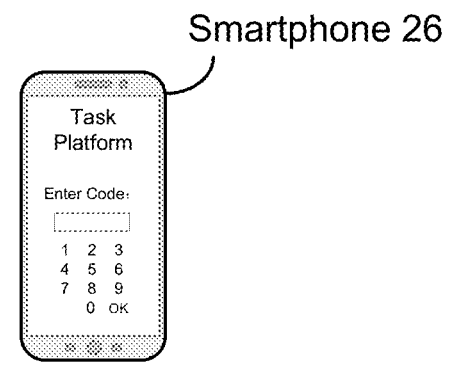
Figure 7:
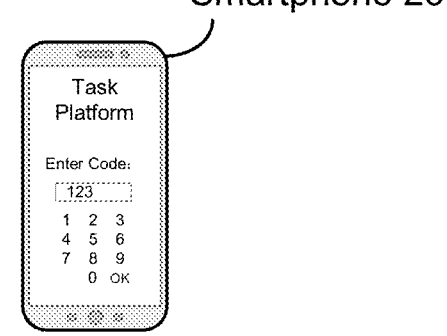
Figure 7:

FIG. 7 uses exemplary diagrams to show one embodiment which utilizes social networking platform to launch a task in accordance with the present invention.

Figure 8:
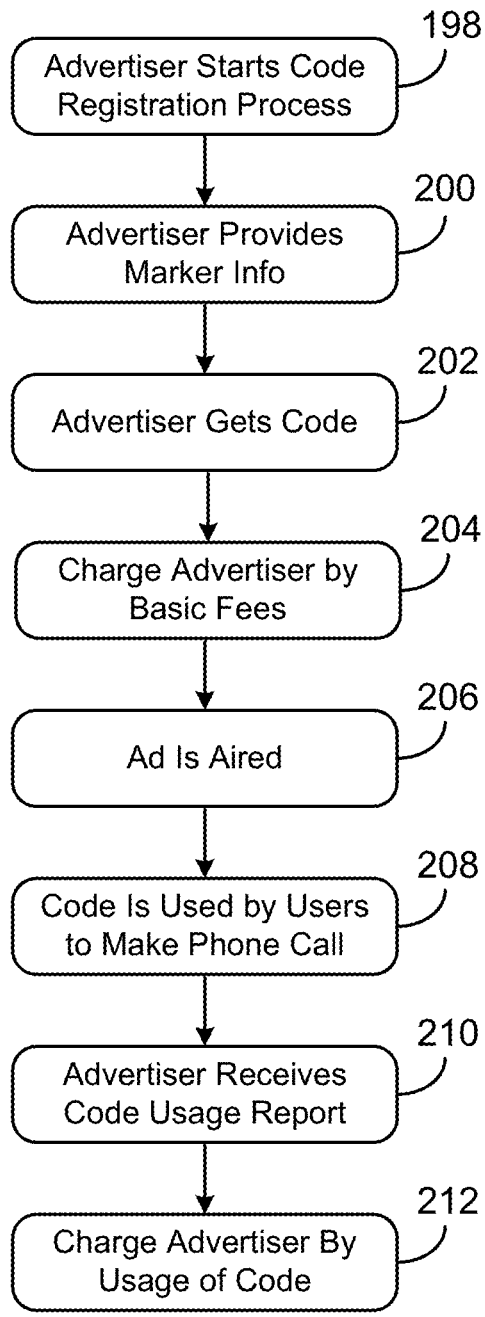

FIG. 8 is an exemplary flow diagram showing embodiment of charging advertiser fees in accordance with the present invention.

Figure 9:
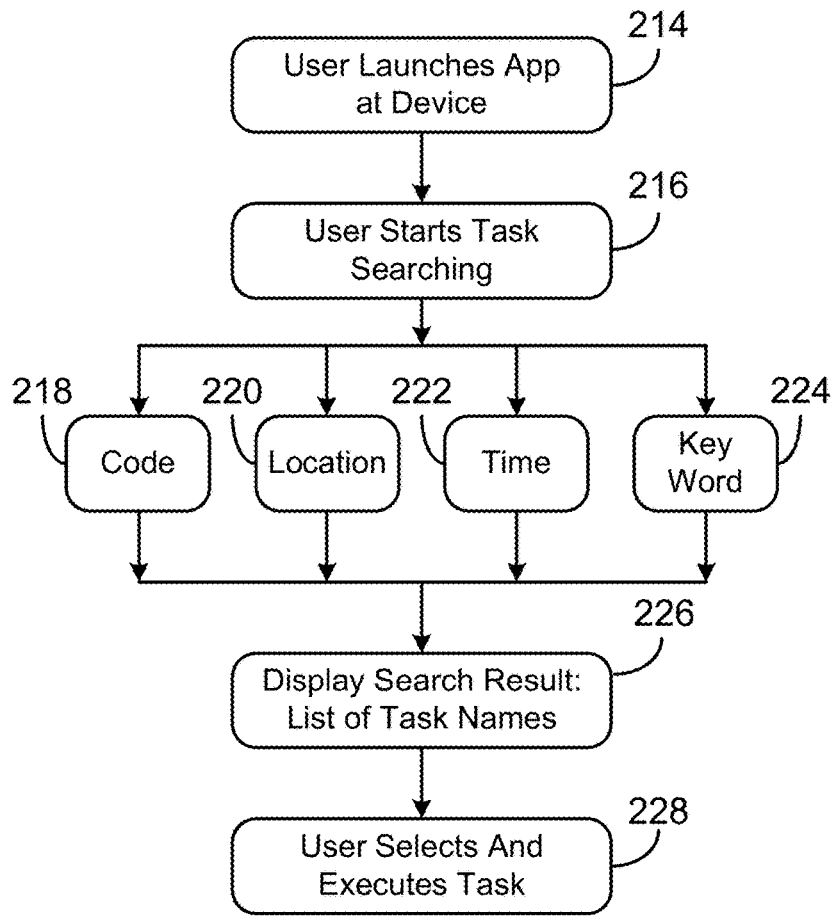

FIG. 9 is an exemplary flow diagram showing embodiments of task searching via query element related to code, marker, or task in accordance with the present invention.

Figure 10:
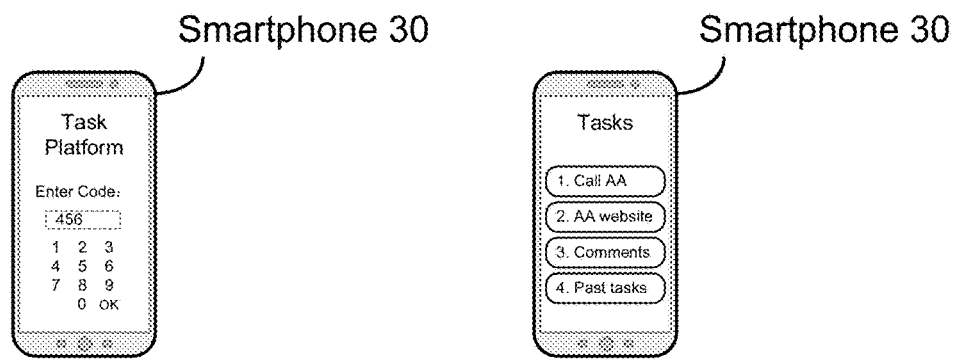

FIG. 10 depicts graphical diagrams illustrating embodiment of displaying multiple tasks in accordance with the present invention.

FIGS. 11-A to 11-D use exemplary flow diagrams and graphical diagrams to show embodiment where one code is assigned to different tasks and applicants.

REFERENCE NUMERALS IN DRAWINGS

| 10 | Sensor | 12 | Device |
|---|---|---|---|
| 14 | Processor | 16 | Computer Readable Medium |
| 18 | Sensor | 20 | Sensor |
| 26 | Smartphone | 28 | Task Button |
| 30 | Smartphone | 32 | Smartphone |

100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214, 216, 218, 220, 222, 224, 226, 228, 230, 232, 234, 236, 238, and 240 are exemplary steps.

DETAILED DESCRIPTION

Figure 1:
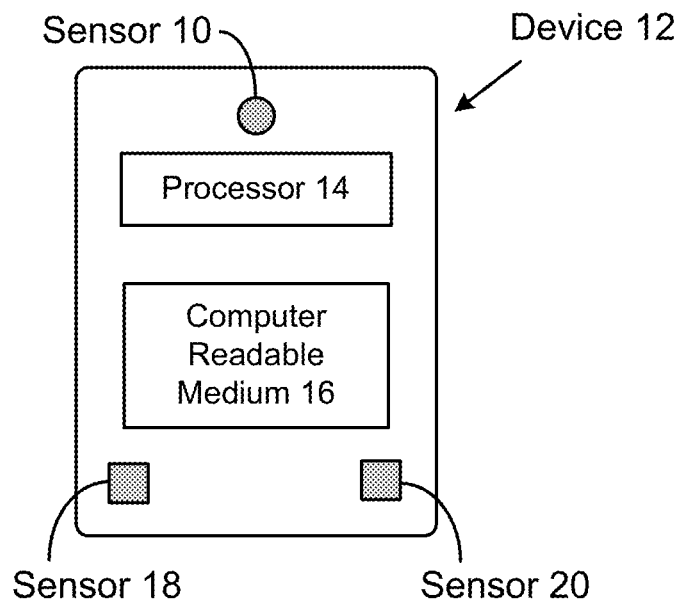
FIG. 1 is an exemplary block diagram describing one embodiment in accordance with the present invention.

FIG. 1 is an illustrative block diagram of one embodiment according to the present invention. A device 12 may represent an electronic device, including but not limited to smart phone, smart watch, wearable device, handheld computer, tablet computer, virtual reality (VR) device, augmented reality (AR) device, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, placing phone call, placing online purchase order, playing video or music, gaming, electronic payment, social networking, sending and receiving emails, short messages, files, and data, executing other applications, etc. Device 12 may also include input, output, and communication components, which may be individual modules or integrated with processor 14. The communication components may connect the device to another device or a communication network. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, tablet computer, smart watch, and some wearable devices. A touch screen may be used as a convenient tool for a user to enter input and interact with a system. Furthermore, device 12 may also have a voice recognition component for receiving a verbal command or audio input from a user. For a VR or AR device, a virtual screen or a screen having a very small size may be arranged. While it is impractical to touch such a screen, verbal commands and gesture instructions may become useful for users.

A communication network which device 12 may be connected to may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by wired, wireless, optical, infrared, ultrasonic or other communication means. Via a network, device 12 may communicate with a remote facility or service center, send data, receive data, and engage in interactive acts.

Device 12 may include a sensor 10 which may be a camera, such as rear-facing camera of smartphone. The camera may be arranged to take pictures as well as scan QR code, one-dimensional barcode, and other machine-readable code with the help of certain application.

Device 12 may also include a sensor 18 which is a near-field communication (NFC) device. NFC is of short-range wireless communication technology and may be employed to read radio-frequency identification (RFID). RFID is a wireless technology for the purpose of transferring identification data passively or actively. A RFID tag may be made very small in size, e.g., smaller or much smaller than one millimeter. It may be placed, for instance, at a designated convenient place at a store, or embedded in a product, for instance, in a magazine. When a RFID tag is read or accessed by user device, the user device gets info stored at the tag.

Furthermore, device 12 may carry a positioning sensor 20. Sensor 20 may be a global positioning system (GPS), which enables a device to get its own location info. Device position may also be obtained using wireless triangulation methods, or via a system using other suitable technologies, which may be arranged by a service provider or service facility. Usually for indoor or some urban environment, positioning methods other than GPS are used, since GPS requires a clear view of the sky or clear line of sight for four GPS satellites.

Inside device 12, output signals of sensors may be transmitted to processor 14, which, employed with certain algorithm, may process the data and send messages to a specific application responsible for working with it. The application may process the messages and proceed accordingly, such as transferring certain info to service center, waiting for instructions or task from the center, and then implementing instructions or carrying out a task.

Figure 2:
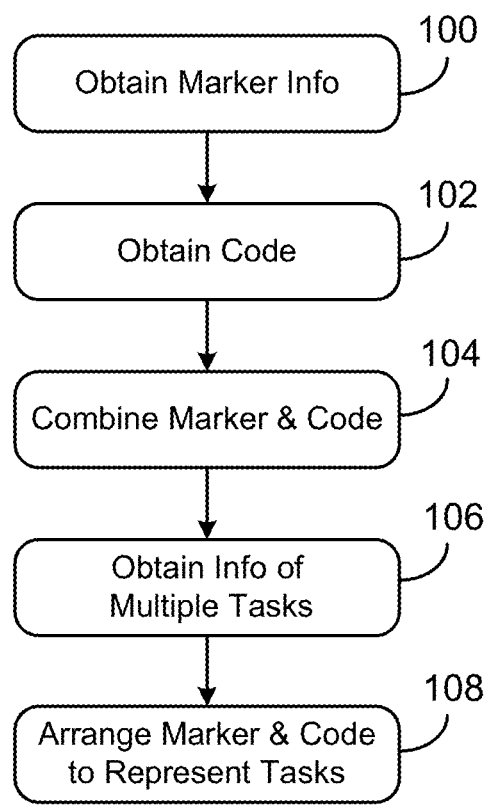
FIG. 2 is an exemplary flow diagram showing one embodiment of representing multiple tasks by simple code and marker in accordance with the present invention.

FIG. 2 is a schematic flow diagram showing one embodiment of granting representation of multiple tasks by service center. An applicant may be of a business, organization, government agency, or individual person who desires to represent certain task by marker and code combination. A user may be any individual or entity who may operate an electronic device or user device to execute a task using a code. Service center handles applications submitted by applicants and helps users executing registered tasks. Combination of a marker and a simple code may be arranged to represent a task exclusively or represent multiple tasks simultaneously. The following discussions are more focused on the latter scenario. Reasons of sharing marker and code are that there is a limited quantity of simple codes which people like and some codes may be in high demand. In Steps 100 and 102, service center obtains marker info and a code from an applicant in a registration process. Marker info may include identification information of location, entity, time, etc. In other words, location, entity, or time may be identified using marker info. One feature of marker is that it may be acquired automatically in most applications. So a user may only need to enter a simple code manually when performing a task. In registration, marker info is provided by an applicant. Code may be submitted by an applicant or suggested by service center. Service center approves marker and code combination. In Step 104, marker and simple code are combined and ready for use after approval. In Step 106, service center obtains info of multiple tasks. The tasks may come from different applicants or belong to a single party. Upon an applicant's request, service center assigns marker and code combination to each of the tasks, that is, arranging marker and code combination to represent the tasks respectively as in Step 108.

Therefore, service center may approve marker and code combination and assign the combination to one or multiple tasks. From applicant's point of view, a request may be submitted at service center to represent one or more tasks by a marker and simple code. Tasks may include calling a phone number, accessing a web page, starting a survey, making another device to do a job, or other assignments. For ease of key-in, a code should be simple, not long, and not very hard to remember, which may in turn provide ease for carrying out a task. Combining marker and code is necessary, since simple codes alone can't meet actual needs due to limited quantity. While a simple code may work as a single label, it may work as numerous labels when combined with various distinctive markers.

Simple and easy-to-remember codes may include "1", "11", "123", and so on. In other words, a code may be as simple as a single-digit number, a letter, a mark, a sign, or an on-screen interactive object, as long as it is unique under one marker. Marker represents additional info attached to a code. In general, a simple code is arranged simpler and easier to use than a regular phone number or website address. For instance, a code may be arranged to have less quantity of members or digits than a phone number which a user may use to place a call. In the United States for example, a regular phone number has seven or ten digits, thus a code may be arranged to have less than seven digits. A code may have six members or elements at maximum for TV or radio commercials, while members or elements may include single-digit number, letter, mark, or sign. On the other hand, codes with more than six members may be used for advertisement arranged for magazine, newspaper, or other printed material, as a user may have more time and greater freedom to deal with them. Preferably, a numerical code with three digits or less may be especially valued for television and radio commercials due to the ease of memorizing it, and its advantage is obvious compared to a seven-digit or ten-digit phone number. Code may be entered by user via tapping on a touch screen at a device. Alternatively, code may also be submitted by user's verbal input using voice recognition technology. Speaking to a device to input a code and give command is in particular useful for wearable gadget, VR and AR devices which may have a small screen or no screen that is unfit for input with finger.

Figure 3:
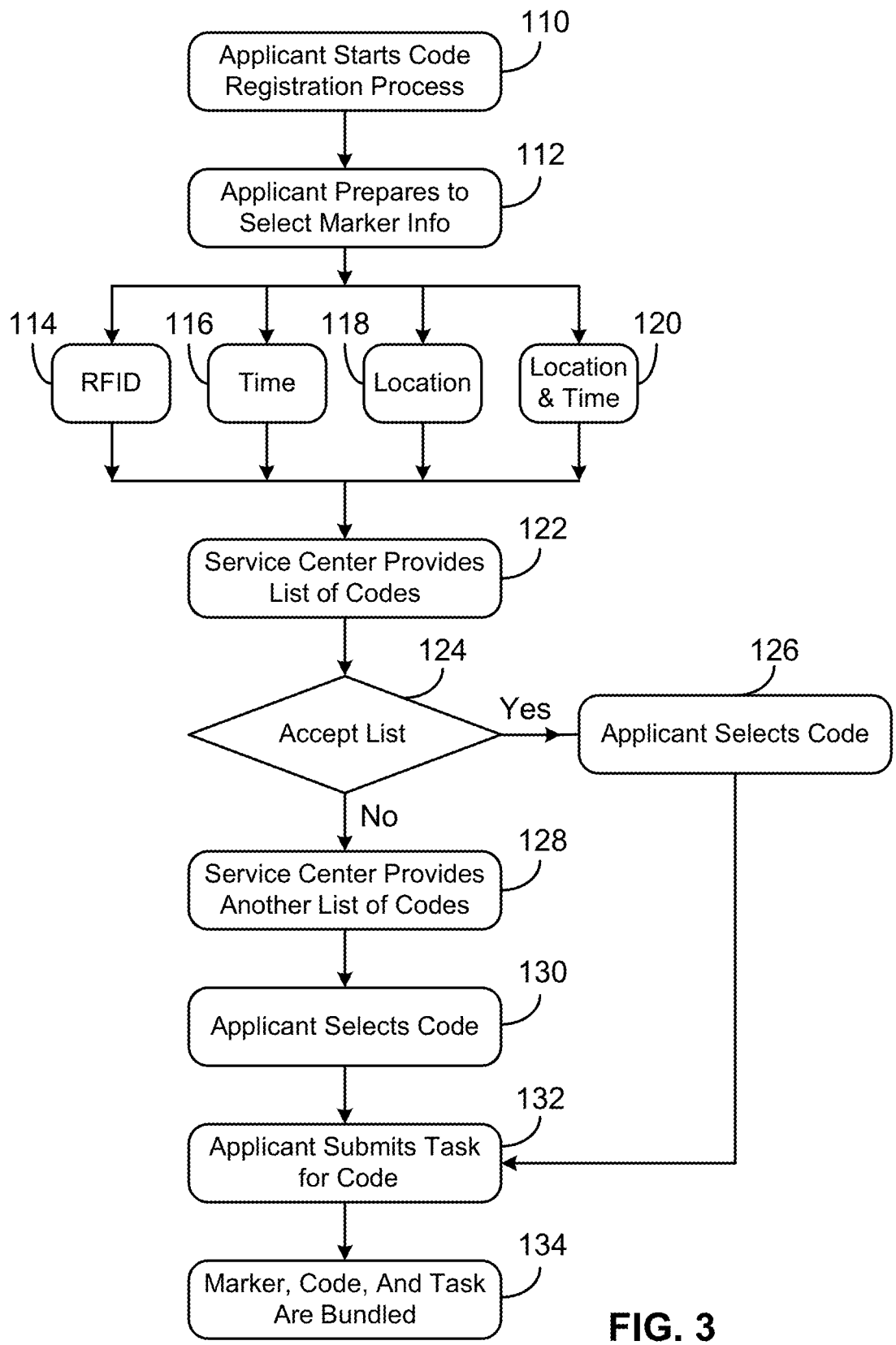
FIG. 3 is an exemplary flow diagram showing registration process involving different markers in accordance with the present invention.

FIG. 3 shows a schematic flow diagram illustrating embodiment of applying for and obtaining a simple code. As discussed, there are a limited number of simple codes because it contains a few digits or elements only. To enhance the usability of simple code, it is combined with a distinctive marker. The combination makes it possible to use a simple code in many occasions simultaneously and distinctively. In the meantime, marker info is better acquired in an automatic manner so that it doesn't cause inconvenience to users. One choice of marker is location, as any location is unique by itself, and location info can be obtained automatically. Another marker type is of time. Time is unique too and thus may be used to define a specific applicable range. Marker info is arranged to contain identification data. Location marker comprises geographic location data for identifying a place. Time marker comprises time data for identifying a time period. Entity marker comprises info such as name or unique feature for identifying an entity. A marker may also contain two types like combination of place and time period. For instance, at a store, a code may represent one product at one time, and the same code may represent another product at another time. Here the marker has both location and time factors. Outside of a store, a store marker may no longer take effect, and a code may mean something else under another marker. For a marker having time factor, time data is required to retrieve a task. Additionally, RFID tag may be used to record marker info. A device may get RFID data via NFC sensor. In such a circumstance, a code is combined with RFID marker to point to a task. RFID marker may include location data, entity data, or event data.

In Step 110, an applicant begins code registration procedures. Next in Step 112, the applicant prepares to select marker information. In Step 114, RFID marker info is selected. In application, when a user device obtains a RFID marker, the marker may remain effective until another marker is invoked or it may be arranged to expire by itself after a given period of time, say ten to twenty minutes. RFID marker may find use for magazine, book, or other objects which circulate in a broad and unpredicted geographic range, where location marker may be difficult to define and use. Furthermore, as RFID marker may contain a name, a location, and time data, it may have an unlimited identification range, such as identifying a business, organization, location, object, or entity. Thus RFID marker may be suitable for all situations. In application, assume that a code app is started at a user device. When a user swipes the device in front of an RFID tag, RFID data may be collected by an NFC sensor like sensor 18 of FIG. 1. Then marker info is retrieved from the RFID data.

In Step 116, time marker is selected. Time info is readily available for every device. A specific time plus a code may form a distinctive signal which may cause a device to launch a task. For instance, an applicant may register code "55" at service center and make it effective only during a specific day. When service center receives code "55" from a user device, it may check when the data was submitted. If the time is another day, no matching task is found. But if the time is within the specific day, service center may find a task, and instruct the user device to do the task. As time marker applies to many places, its corresponding code shall be selected carefully to avoid duplicate case. Time marker is useful for situations where time is an important indicator, while location plays a minor role. For instance, a time marker may be used with radio advertisement. No matter where a listener is located, after an app is launched on a smartphone, a user may enter a simple code to log on a web page, or dial a phone number. Thus instead of dealing with complicated URL or a long phone number, a listener may just need to play with a simple code to contact a business or organization.

Step 118 introduces location marker which an applicant may select at service center. Location marker, containing location data, may have a fairly clear geographical definition. A location marker may cover a spot, small area, large region, business, home, venue, town, province, or nation. If GPS signals are available, data obtained by GPS may be transferred to service center automatically and used as marker info. When service center receives a code and GPS data, it may use the information to find a matching task at database. If GPS method is unavailable due to indoor or urban conditions, location data obtained by other method like triangulation may be submitted to service center. Usually, triangulation schemes are performed by certain service facility or wireless service provider. Service facility or service provider may send user's location info to a corresponding user device or service center based on contract prearranged.

At a store, a code may be configured to point to a product or a task for a long time. But at home, a code may be in use for a short time period only. For instance, a code from an ad printed on newspaper may be arranged valid for a few days or a week, as a copy of newspaper may be forgotten after a day or two. Thus in certain cases, an applicant may want to have two limiting factors for a marker: Location and time. In Step 120, a user chooses location plus time marker. Such marker may be useful for airport, school, or convention site, where things change over time frequently. Between a location marker and location plus time marker, the main difference is of change with time. For the former, a marker is valid all the time unless being cancelled, while in the latter case, a marker only works within a given time frame. Similarly, RFID marker or other markers may be combined with time marker so that a simple code under the same situation may point to different tasks at different time slots.

After service center receives marker info from an applicant, it may generate and present a list of codes in Step 122. The list may contain several codes, such as two to five, for the applicant to select. If the list is accepted in Step 124, the applicant may take one code in Step 126 and then go to Step 132. If the applicant doesn't like the list in Step 124, service center may provide another list in Step 128. Assume that the applicant accepts the list this time and selects a code in Step 130.

After a code is chosen, the applicant may submit a task in Step 132. Task info is provided by the applicant and evaluated and approved by service center. For instance, a task may be designed executable by certain user device and a service facility like service center. A task may contain two parts. In the first part, a task may ask service center to send an action item to a user device. In the second part, the task may instruct the user device to execute the action item. Finally in Step 134, the code, marker, and task are finalized, bundled, and recorded at service center. The bundled info may be stored at service center database and arranged to be found via the code and marker in the future. After registration, an applicant may publicize a task along with a corresponding code on television, in radio, at store, etc. When a user wants to perform a task, the user may find a code and enter it at a user device. Then, the task is executed.

Figure 4:
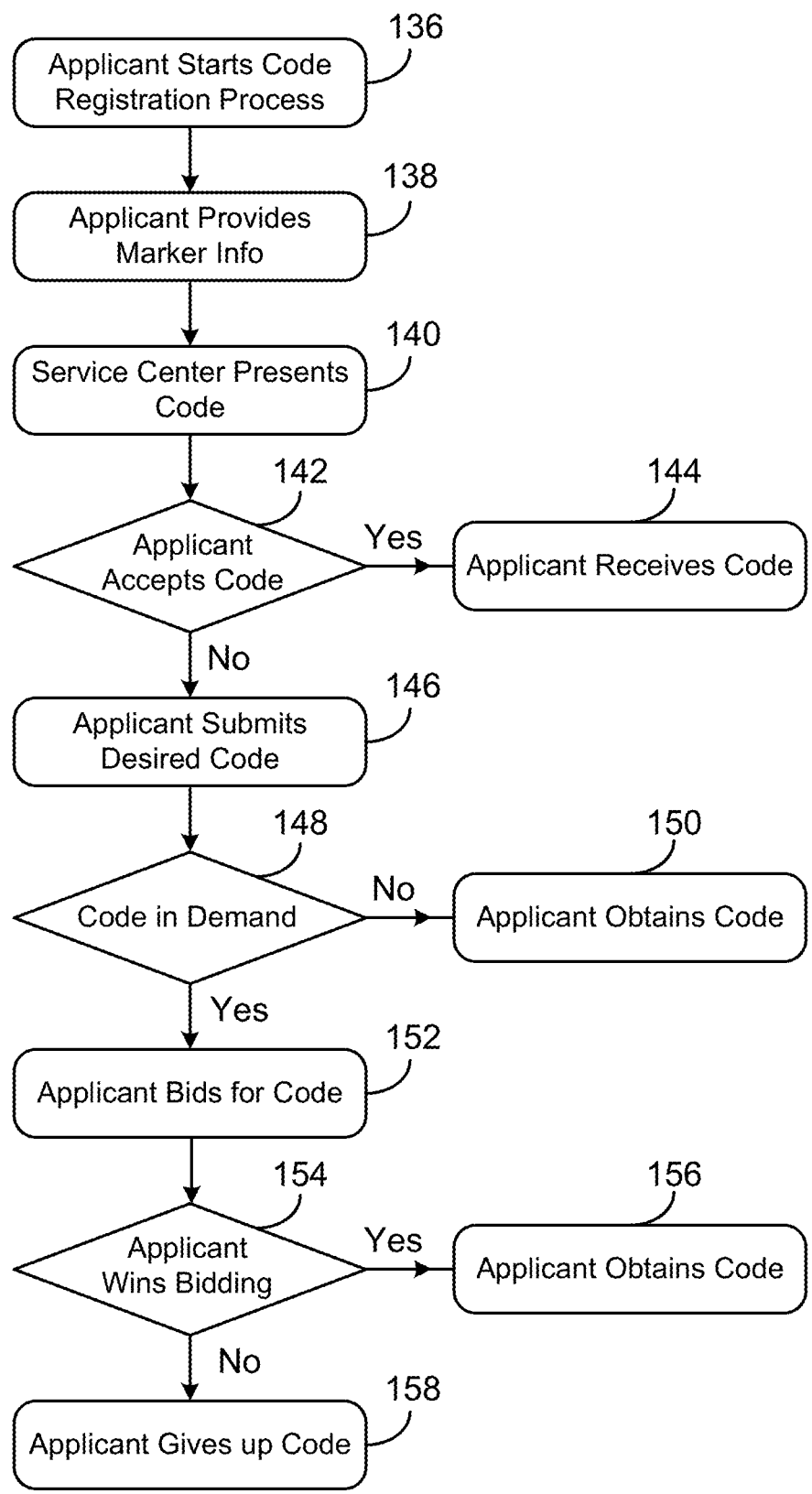
FIG. 4 is an exemplary flow diagram showing registration process involving code bidding event in accordance with the present invention.

FIG. 4 depicts another schematic flow diagram of registration process, in particular, process concerning a popular simple code. Assume an applicant wants to get a code as contact info which would be presented in television commercial. In Step 136, the applicant logs on service center website and gets started. In Step 138, the applicant submits marker info, like location and time data, which may reflect where and when a commercial is scheduled to air. Next in Step 140, service center gets codes which are still available and presents some to the applicant for consideration. If the applicant likes one code in Step 142, code assignment is completed in Step 144, and code and marker info would be assigned to a task that the applicant provides. If no code is accepted in Step 142, an applicant may submit a desired code in Step 146. For instance, an applicant may like a particular code and think the code may enhance advertising effect, or the code may be easily cited and remembered and thus make contacting process easier and more likely. Examples of easy-to-remember code may include "11", "22", "123", etc. But thinking toward simple code may be similar among applicants, which may cause certain code in high demand at service center. Thus the center may ascertain whether a code is sought by multiple parties for the same marker range during the same time period in Step 148. For instance, two applicants may request the same code for the same location within overlapping time frames. If a proposed code is not in contest among parties, an applicant may get it in Step 150. If a code happens to be the one sought after by multiple parties, a bidding process may be arranged in Step 152, which means the code would go to a bidder who is willing to pay the highest price. Next in Step 154, if the bid is a success, the applicant secures the code in Step 156 for a predefined time period. If the applicant loses the bid in Step 154, the code is lost in Step 158. It is noted that applicants may bid for using a code exclusively or for sharing a code with other parties. In the latter case, marker and code info may cause display of a list of tasks on a device screen.

A task may be performed at user device as a result of entering a code or sending code and marker info to service center. For instance, assume a code is "234", marker is user's home location, and a designated task or action item is to call a phone number. When a user opens an app at home, a smart phone in use starts collecting location data as marker info, i.e., home's geographic location data. Next the user taps "234" and "OK" button to send code and marker info to service center. Upon receiving the message, service center conducts a search to find a corresponding action item, i.e., calling a number. Service center sends instructions to the phone. The instructions prompt the phone to make a call. Thus, a task may be performed using a simple code. The process is easy and convenient.

When simple code method is available, it may be used in advertisement. For instance, an ad may say, "Contact us, please call 1-800-xxx-xxxx, or tap 123". It is obvious that a user may easily remember 123, but may have a hard time to handle the 800 number. Meanwhile, marker info needed may be obtained automatically, without user involvement. Thus, a simple code provides an easy and convenient way to place a call or perform a job, such as accessing a website, sending a message, placing an order, scheduling pickup, causing another device to perform a predetermined job (like prompting a system in another place to turn on), etc. Advertiser may present several codes for different tasks or action items. Alternatively, advertiser may also use one code to represent several tasks. In the latter case, entering a code may invoke presentation of a list of tasks on a display of user device. Currently, an ad may contain two kinds of contact info: Phone number and web address or email address. With simple code, another contact method becomes available in advertisement and to a certain extent, simple code method may be easier and more acceptable by users. In some cases an ad may present a code as the only contact information, without mentioning phone number, website address, and email address. Code-only contact info may make advertisement more concise and possibly more effective. It applies to all types of media, traditional and electronic. For instance, while a phone number contain seven or ten digits in the United States, a simple code may be arranged to contain one to three digits, or at most six digits. Code-only contact info may be especially suitable for television commercial, radio commercial, and ads prepared for VR and AR devices.

In some applications, there may be a single task attached to code and marker combination. After a user enters a code, user device may execute a task directly, or display an interactive task button on device screen and await command from the user who may take a look at the task and then tap it for execution. In other applications, multiple tasks may be assigned to code and marker combination. Due to limited availability of simple codes, some business entities may want to share code and marker combination. For instance, a popular code may be assigned to tasks of several entities. After a user keys in a code, multiple tasks may be retrieved from service center and displayed on user device. The user may view the tasks and tap one to execute it.

Figure 5:
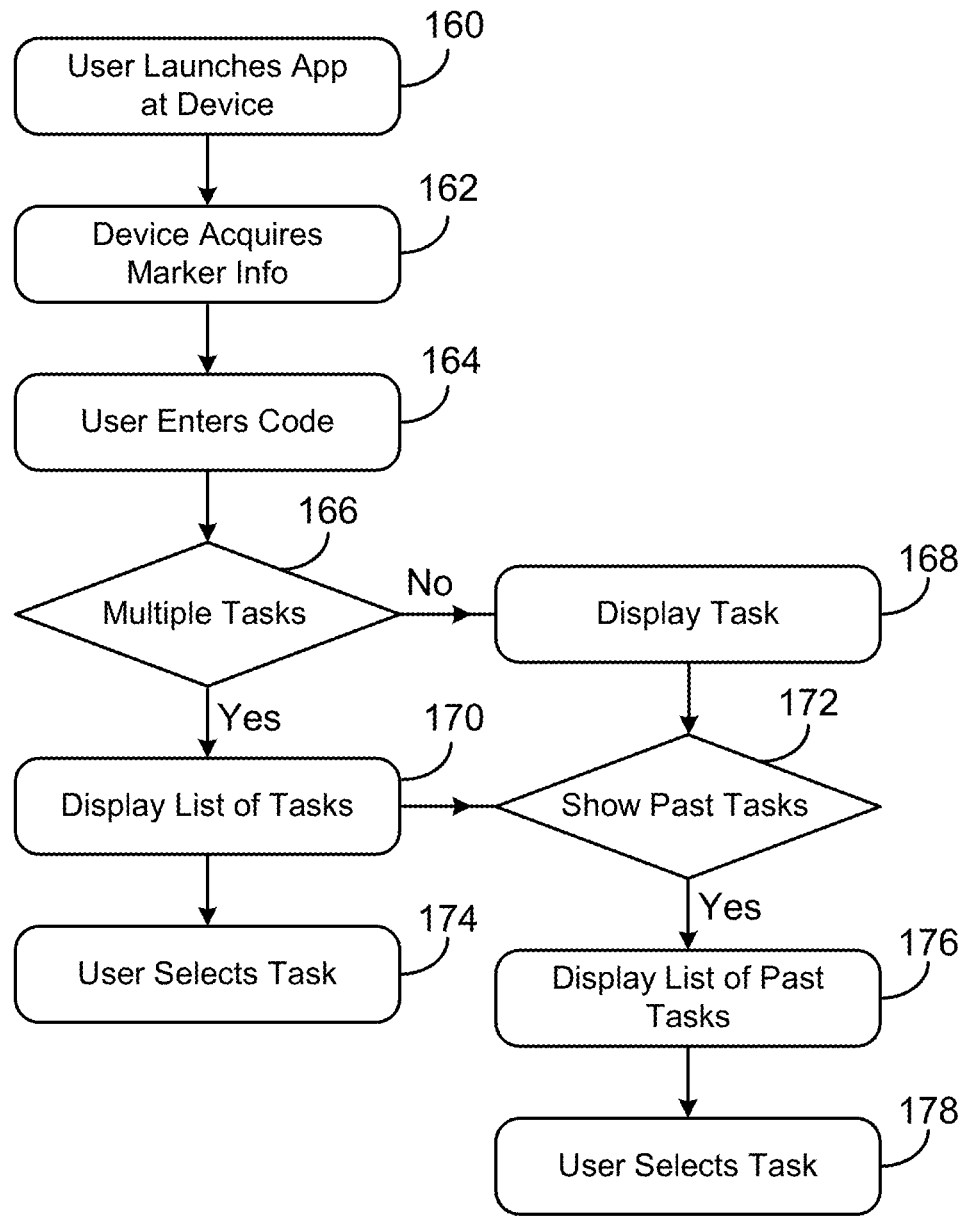
FIG. 5 is an exemplary flow diagram illustrating embodiments of presenting multiple tasks and past tasks in accordance with the present invention.

FIG. 5 shows a schematic flow diagram illustrating an embodiment which deals with multiple tasks and past tasks. A user opens an app at a device in Step 160. Next the device starts collecting marker information automatically in Step 162. In the meantime, the user enters a code in Step 164. Marker and code info is transferred to service center instantly. If service centre retrieves a single task in Step 166, the task is sent to user device, executed directly or displayed on screen in Step 168. If service center retrieves multiple tasks, names of the tasks are given to user device and presented on screen in Step 170. For instance, a list of interactive icons may be displayed, where each icon carries a respective task name. A user selects a task by tapping an icon in Step 174 and proceeds with it.

After receiving code and marker info from a user, service center checks sending time of a message, since most tasks have prearranged time requirement. A matching task means not only matching codes, matching markers, but also matching time factors, like sending time being within a time frame. Thus only the latest tasks, which are arranged for the current time period, are retrieved and sent to user. But sometimes a task assigned to a time slot in the past may be sought after too. For instance, a user may have listened to a radio commercial in the previous day and want to know more about a deal advertised. The user may still remember the code, as it is simple and easy to remember. But time marker of the task may be related to a passed time block. Thus there exists a need to retrieve previous tasks assigned to code and marker combination. For instance, an app interface may be arranged to have a functionality which may recall past tasks related to current code and marker combination. Returning to the flow diagram. After Step 168 or 170 is done, a user may go to Step 172, where an option is prepared for checking past tasks. For instance, an interactive button may be configured at app interface on a display screen. A label like "Past Tasks" may be attached to the button or placed beside the button. When the button is tapped, a list of past tasks may show up on screen. In the flow diagram, when a user enters command to show previous tasks in Step 172, some past tasks are retrieved from service center and displayed in Step 176. Past tasks may include those that are associated with the current code and marker info but arranged for elapsed time periods. It is noted that past tasks are searched based on a code just submitted by user and present marker info obtained by user device. After reviewing previous tasks shown on screen, a user chooses one item and carries it out in Step 178. Ability to reach old tasks may enhance code method, since it enables a code to represent more tasks and extends the effective time period of tasks.

Figure 6:
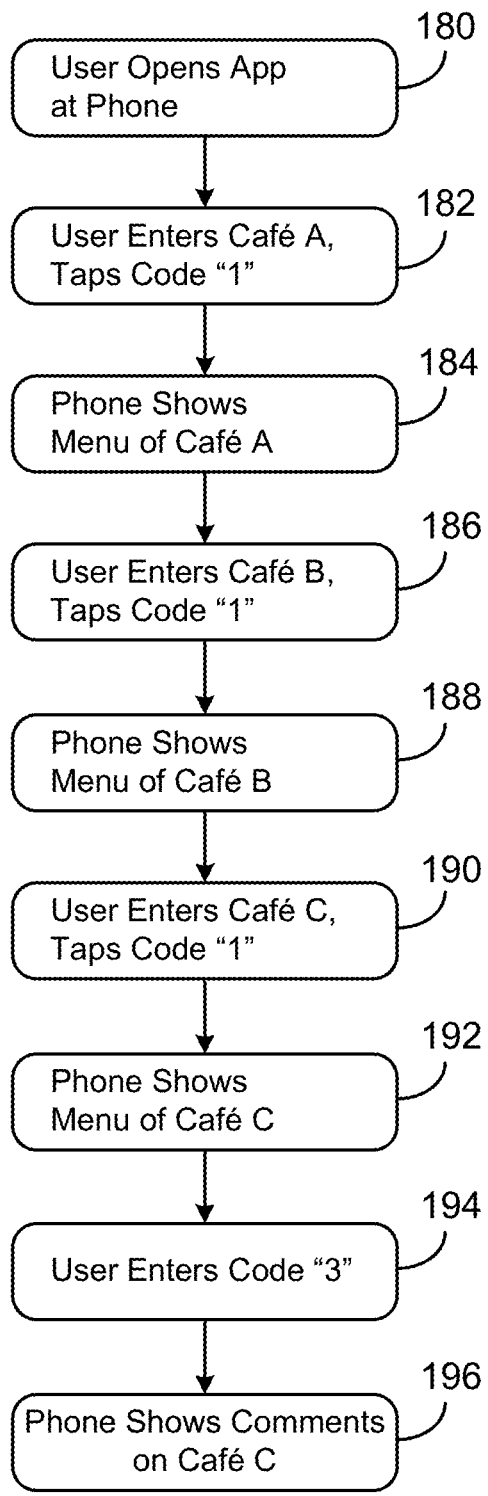
FIG. 6 shows an exemplary flow diagram describing embodiment of using one code for similar tasks at multiple places in accordance with the present invention.

FIG. 6 shows a schematic flow diagram depicting application of "standard" simple code. As discussed, simple code, marker, and task may be defined by applicant and submitted to service center during registration process. Usually, applicants may have their own preferences. For instance, code "11" may mean accessing a website at one store, but may mean placing phone call at another store. So a user may have to find out code definition at each place before using it, which may become a nuisance. Thus it may be convenient if some often-used tasks employ "standard" code or fixed code. For instance, a code may be "designated" for tasks of certain type at different locations. Those tasks may have similar purposes and the same nature, or provide the same functionality. For example, online menu or online catalog, online ordering, and comments may be frequently performed tasks in restaurant and retail sectors. For such common tasks, "standardized" code may be useful and helpful. Again, concerning restaurant and retail business, it may be arranged that as a "standard", code "1" stands for online menu or online catalog, "2" for online ordering, and "3" for customer comments. As a result, a customer may not need to check the meaning of code every time when entering a new place, and code method may become easier to do and more acceptable.

In practice, service center may make a suggestion to applicant during code registration process. For instance, service center may let applicant identify business type before code selection step. If it is of retail store or eatery like restaurant or coffee shop, service center may present suggested codes for common tasks such as that just mentioned. An applicant may accept the "standard" code or replace a suggested code by another one. Registration process may be arranged simple and straightforward. For instance, a space may be arranged at registration interface for applicant to select business category. Also arranged is a check box named "Standard Code". An applicant may select a business type like retail, check the box, and then submit the info. Next, a list of common tasks may be presented along with suggested codes on screen. The first task may be of online catalog. A small code-input window showing number "1" may be configured beside the first task with name "Online Catalog". An interactive button "Task Input" may be placed on the other side of the first task. A user may accept code "1" or change it by entering another number in the small window. The "Task Input" button is prepared for uploading catalog file or address of web page which features catalog info. It is noted that in the case of "standard" code, service center predefines or suggests part of a task or nature of task for applicants, which may happen before registration process. However for other codes, an applicant is responsible for determining the nature of task, while service center may play no part in it.

In FIG. 6, it is assumed that many eating places and stores located in a region follow a rule arranged by service center. According to the rule, code "1" under a business marker means presenting online menu or online catalog and code "3" means accessing comments page. As each business has its own menu or catalog, tasks of showing menu or catalog at each place are not identical. But the tasks are quite similar, have similar objectives, and the same nature. The same is true for task of accessing comments site. Thus during code registration, each business may accept or select code "1" for displaying menu or catalog and code "3" for accessing customers' comments. In Step 180, a customer or user starts a code app at a smartphone. After the user walks in Café A, he or she enters "1" at app interface in Step 182. Then in Step 184, online menu of Café A is displayed on phone screen. Next, the user pays a visit to Café B and enters code "1" again in Step 186. Then in Step 188, Café B's menu shows up on phone screen. A short time later, the user goes to Café C and taps "1" on screen one more time in Step 190. Then Café C's menu appears on phone screen in Step 192. After some time at Café C, the user wants to look at customer comments. He or she opens the code app again and taps "3" and "OK" button in Step 194. Consequently in Step 196, the phone screen starts showing a collection of comments made by customers of Café C.

From above-discussed embodiments, it is seen that code method may make performing a task easy and simple. But in order to use a code, a code app has to be launched at user device. Finding and starting an app may incur certain inconvenience, since a code app may be screens away and starting process may take some time too. Nowadays many people may log on a social networking platform frequently to check messages, updates, and events. It may cost less time and make code method more user-friendly if code function could be added to or embedded in social networking environment. For instance, it may be designed that an interactive launch button of code app is arranged at social networking interface. Activating the button may invoke a code application. Furthermore, a social networking program may incorporate code functionality such that a user may tap a button to enter a task page or pop up a task window, where the user may enter a code to implement a task without starting code app.

FIG. 7 shows graphic diagrams illustrating an embodiment which enlists help from social networking configuration. A smartphone 26 is displaying a social circle interface in Step 1. There may be some graphic objects or icons arranged at the interface, representing members and some functions in the social circle. And there is a soft button or task button 28. Button 28 works as launch pad for code method. Assume that a user is watching a commercial on TV and wants to know more about a travel package. The user taps button 28 in Step 1. Then in Step 2, the phone's screen shows a window for code entry with a title "Task Platform". Meanwhile the phone starts gathering marker information. In Step 3, the user enters code "123". Next, code and marker info is transmitted to service center. And then in Step 4, phone 26 gets instructions from service center and starts calling phone number of a travel agency. In Step 2, the task platform window may be part of social circle setting, when the social circle program contains code functionality. Alternatively, it may be an interface of a code program, which means button 28 invokes a code application.

Since a user may stay in a social circle for quite some time, or check messages and updates in a circle frequently, a social circle interface may become a convenient starting point to perform a task or start a code program. When a user is in a social circle, he or she may prefer tapping a task button rather than leaving the circle and finding a code app somewhere else. Therefore, code function arranged in a social networking configuration may make task execution easier to start and benefit circle members.

Service center may provide free code service for some users, probably individuals, but may charge fees for business use, especially for use in advertisement. FIG. 8 shows an exemplary flow diagram illustrating a charging scheme for code usage. Assume an applicant involved is an advertiser. The advertiser begins to register a code in Step 198. Next in Step 200, maker info like location and time is submitted. The location info may include locations or areas where an ad is scheduled to air on television or in radio. A time slot may cover a time period after an ad is aired. The advertiser gets a code in Step 202. The code may be submitted by advertiser and approved by service center. The code, under predefined marker, may be arranged to invoke certain device to call a phone number. Then in Step 204, the advertiser may be charged with basic fees, such as registration fee, marker fee, code processing fee, etc. Later on in Step 206, an ad is broadcasted on television, where a code is presented as contacting info, along with a phone number. After the ad is aired, some users make phone calls directly and some enter the code to place calls in Step 208. When service center receives code and marker info from a user, the center retrieves a calling task and sends it to the user. Then the user device starts call the number. A period of time later, service center gathers data on code use and generates a code usage report. The report is sent to the advertiser in Step 210. In the report, it may contain a summary describing how many times a code was used, time data about when users entered code, areas where code was used, and other related info. Then in Step 212, the advertiser may be charged by code usage fee. Usage fee may be calculated based on the total number of times a code was used. Usage fee may also be designed to be related to location info, since location data may be valuable information too. For instance, inquiry calls for an advertised product may be worth more if it comes from a well-to-do community or an affluent city. Thus charging rate may be partially determined by area or region.

When there is a code displayed beside an object on display, there may be a task which presents introduction or description of the object. Thus a code may mean availability of carefully prepared information aside from performing a task.

Occasionally, a tourist may want to find out more info about a painting at a museum visited days ago, but never memorized the painting's code. The user may do a regular search on the Internet, which however, may not be efficient, as it may generate seemingly endless contents of all kinds. Since there is a code attached to that painting, code-directed content may be more helpful and authentic, as it may be prepared professionally by the museum. Take another example. A user wants to learn more about a product which was introduced in a TV commercial sometime ago. But the user can't remember the code. Thus there exists a need to search a task ever registered at service center, which may help recover lost task or obtain quality information from more reliable source. Task search may be initiated by user and conducted at database facilities of service center. Service center database, which hosts data of code, marker info, and tasks, may be searched via element or elements such as number, word, character, or sign which may be related to code, marker, and task information.

FIG. 9 is a flow diagram showing searching embodiments schematically. Assume a user wants to get more information after listening to a concert commercial aired in a radio program. When the user heard the ad, it was inconvenient to make phone call. But when the user is free, he or she couldn't remember the code. Then in Step 214, the user opens a code app at a device such as smartphone and begins task searching in Step 216. For convenience of search, a soft button or graphic object may be arranged at app interface, with a word "Search" on the button or beside it. The user may tap or click the button to get started. Next a list of objects as search options may appear on screen based on search methods arranged. The objects may have labels such as "Search by Code", "Search by Location", "Search by Time", and "Search by Key Word", etc. A user may enter a query like word, number, sign, or character in an input space next to an object or search option. A user may use one input space to do a single-type search or use more input spaces for multi-type search, such as search by code and location together. Then a user may tap or click an interactive "Submit" button to transfer query info to service center which in turn searches database based on the received info. In Step 218, search is conducted by code. Assume that an original code is a three-digit "278", but the user only remembers "78". The two digits "78" may be used as query element for code search and provided to service center. After getting search type which is of code and number "78", service center may search codes ever created and find codes which contain "78". Next service center may fetch latest tasks corresponding to codes found in the search. Names of the latest tasks may be sent to user and presented on user device in Step 226. But there may be many tasks which fit the requirement, since there are many numbers containing "78". In addition, for one code, there may be many markers, like location and/or time markers, pointing to many tasks. For instance, code "278" may be used many times during a day and may be used simultaneously in many places at any time. Thus to make search results more relevant, other query item should be added. For instance, "78" may be combined with another query containing name of a singer who would perform at the concert.

In Step 220, location-based search method is used. For instance, a user may recall where the concert would be held, enter concert place in an input place beside "Search by Location" object, and then tap "Submit" button to start search. When there are too many search results, time may be used to narrow the search scope. Here time may mean the effective time period of a task. For instance, a user may enter "past day", "past three days", or a date beside "Search by Time" object. In fact time data itself may be used as key word in a search, as shown in Step 222. Time data may include a time block or a specific time spot. It is assumed that a user uses time data plus other info in a search, not just time data. If no data besides time is provided, service center may do a search based on the time info and current marker info obtained by user device. For instance, assume that a user is at home. Home marker info may be automatically obtained and used for time-data based search when a user doesn't give any other input.

In Step 224, a search is based on key word. For a concert, a user may recall concert name, song name, band name, singer name, and so on, and enter them in input space beside search object "Search by Key Word". This type of search may also be combined with other types. A user may enter words in several input spaces and then tap "Submit" button. Next in Step 226, search result are obtained from service center and displayed on user device. The result may contain a list of task names and optionally effective time period of each task. A user selects and executes one which seems related to the concert in Step 228.

Since codes may be presented via television program, radio program, newspaper, billboard, internet, VR or AR program, and so on, an option may be arranged for user to select medium type in a search. For instance, a list of media may be arranged at search interface. The list may contain small icons representing television, radio, newspaper, magazine, etc. If a user remembers that a task is introduced in a radio broadcast, the user may enter some queries, check a box beside "Radio" icon, and then activate "Submit" button. Because medium of radio is chosen, a search at service center is carried out to retrieve relevant tasks that were presented in radio programs.

Sometime a search may generate a great number of tasks. Thus service center may process search results first. For instance, when multiple tasks related to entity C are retrieved, an object "Tasks from Entity C" may show up in a result list. When the object is tapped or activated, another list appears which presents action items from the entity. Service center may produce other summaries like "Tasks at Location X", "Tasks Related to Event V", "Popular Tasks among Results", etc. Thus it may be arranged that the first page of search result presents a list of tasks and task summaries using interactive objects. Objects standing for task and summary may have different appearance in terms of shape and color for easy distinction and handling.

A code may be associated with one action, like calling a phone number, accessing a web page, or displaying an interactive object representing a task to be performed. In some cases, a user may be uncertain about what to do first, unsure about which tasks are available, or want to have an overview before taking an action, and thus it may be helpful if multiple related tasks are presented together for user to check them out and select one. FIG. 10 shows such a situation with exemplary diagrams. Assume that a company AA registers multiple tasks using code "456" and one or more markers at service center. For instance during registration, a check box with a label "Multiple Tasks" may be arranged at service center interface. After obtaining approval of code and marker combination, company AA may check the multi-task box and then enter names of each task and uploading details of all tasks respectively. The figure describes application on user side. A code app is started at a smartphone 30. In Step 1, a user enters code "456" on a start page. Next code and marker info is sent to service center. Service center finds out that it is a multi-task case. Then matching tasks are retrieved from database and transmitted to phone 30. In Step 2, the phone presents a list of tasks. The first action item is to call customer service of company AA. The second one is to log on AA's website. The third item is about accessing comments page, and the fourth one leads to display of past tasks created by AA. Assume that each action item on screen is an interactive object. In front of four options, a user may take a look at them and then tap one to do it.

As discussed, the quantity of simple codes are limited, especially those which are easy to remember and liked by many. Therefore there exists a need to assign code and marker combination to unrelated tasks, such as tasks submitted by different applicants, like purchasing movie ticket arranged by a company and showing class schedules arranged by a community college. A registration process may be configured to allow multiple applicants to share code and marker combination. For instance, a check box with label "Share Code & Marker" may be configured at registration interface. An applicant may check the box to indicate acceptance of sharing code and marker with others. Service center may arrange a group of codes for exclusive use and another group for shared use, and present different codes to applicant according to applicant's choice. FIGS. 11-A and 11-B show two exemplary flow diagrams illustrating code registration process at service center. Assume there are two applicants, applicant W and applicant T, and both want to have code "777". In Step 230 of FIG. 11-A, applicant W begins code registration process. Next in Step 232, applicant W fills out an online application form to submit location 5 as location marker, number "777" as code, a period of time as time marker, and Task 1 as action item. After applicant W taps or clicks "Submit" button, an error message may appear, saying code "777" is for shared use only. Then applicant W may check "Share Code & Marker" box at the interface and resubmit the form. After approval, service center grants code "777" to applicant W in Step 234. FIG. 11-B shows a similar process, applicant T starts registration process in Step 236 in pursuit of code "777". In Step 238, applicant T enters the same marker location 5, the same code "777", the same time slot, and Task 2 as action item. Next applicant T selects sharing option by checking "Share Code & Marker" box and then submits the request. Consequently applicant T receives approval from service center and obtains code "777" in Step 240.

As the codes are identical, and so are the markers, entering code "777" at location 5 causes retrieval of two different tasks belonging to two applicants. FIGS. 11-C and 11-D show two graphic diagrams to illustrate an application. Assume user Z arrives at location 5 and wants to perform Task 1. The user launches a code app at a smartphone 32. A screen of task platform appears. In FIG. 11-C, user Z taps code "777" in a code entry box. Next code and marker info is sent to service center, which in turn finds that Task 1 and Task 2 are the matching action items. A message containing names of the tasks is transmitted to phone 32. So in FIG. 11-D, two buttons "Task 1" and "Task 2" are displayed on phone screen with a title "Tasks under Code "777"". Next, user Z taps on "Task 1" to execute it.

CONCLUSION, RAMIFICATIONS, AND SCOPE

Thus it can be seen that systems and methods are introduced to utilize simple code to represent one or multiple tasks and help user perform a task.

The improved method and system have the following features and advantages:

(1). Applicant may register a simple code, and bundle it with maker info to represent one or multiple tasks;
(2). Applicant may get a popular code in a bidding process;
(3). One code may be assigned to similar tasks owned by different applicants for use at different places;
(4). User may retrieve past tasks under marker and code combination;
(5). Social networking platform may be used to launch code method;
(6). User may search a task by query related to code, marker, and task.

Although the description above contains many specificities, these should not be construed as limiting the scope of the invention but as merely providing illustrations of some of the presently preferred embodiments. Numerous modifications will be obvious to those skilled in the art.
Ramifications:

An on-screen sign may be used as marker, code, or part of code. For instance, certain signs may be arranged beside a virtual or soft keyboard in a code entry window so that a user may tap a sign conveniently when keying in number and letter. Examples of sign may include a house icon for user's home, fork and knife representing restaurant, car sign for taxi service, bus picture for bus stop location and schedule, or logo of a business. For instance, if a user is looking for an eating place around lunch time, he or she may tap a restaurant sign or a restaurant sign plus a number, and then tap "OK" button on a code app page. The sign may serve as code or part of code and device location data as marker info. A sign-only code may lead to a group of tasks, while a sign-plus-number code to a more focused group or a single task. Next code and marker may be sent to service center. A list of tasks may be retrieved and presented to the user. On screen, each task object may show a name of restaurant in the area. The user may select one to start reviewing. On-screen sign may also be an interactive object working as code, which, when activated, may cause transmission of code and marker info to service center directly. For instance, an on-screen business logo may be arranged as an interactive object. A user may tap the logo to execute a task prepared by a business without performing a separate submit step like tapping a "Submit" button.

RFID marker may be desirable at stores where positioning marker is not available. For instance, a user may swipe a smartphone in front of a RFID tag on a store counter to get a RFID marker. Next the user may tap a simple code displayed at the store to do a job such as searching product, booking service, or placing order. The RFID marker may continue working until being cancelled or the location is changed.

After service center receives marker and code combination from a user, the center conducts a search at database to find a matching one and a task attached to it. But sometimes, service center can't find it due to wrong marker and code combination. For instance, a user may enter a wrong code with correct marker info, a correct code with wrong marker info, or a correct code with fuzzy marker info. In the first scenario, service center assumes that the marker info is correct. The center may find tasks with a code that is close to the code submitted and having the same marker info. Names of tasks may be sent to user along with an error message saying that a match can't be found. In the second scenario, service center may find tasks which have the same code but with other possible marker info, such as a location marker of a nearby place. In the third scenario, marker info obtained is not accurate enough. For example, service center may receive location data which covers multiple location markers. When a user is at a shopping mall for instance, location data may not be precise enough to determine which store a user is in and the data may only be used to identify an area including several stores. Thus tasks assigned to related stores with the same code may be retrieved and presented to user. It is noted that service center may take both scenario one and two into account when it is hard to tell whether a user enters a wrong code or enters a code at a wrong place.

As VR and AR devices, wearable devices, such as smart watch, smart band, smart ring, and other tiny or small gadgets, may have a small screen or no screen, verbal or audible instructions by user may become useful and important. For wearable devices and other small-sized gadgets, audio output of device may be useful too. Code method advocates using simple code to perform a task, and thus may be in particular fit for such applications. For instance, a user may say a code to perform a task and a task or multiple tasks may be presented to user audibly.

For VR and AR devices, images and programs are presented to users individually. Each image or program may be used as a marker. A code entered by user may be combined with program marker automatically. If there is an image marker in a program, the image marker may replace the program marker, though still under the program marker. For instance, assume a VR device is connected to the Internet. The device shows an image. The image contains an object with a contact code attached. When a user submits the code at the device within certain time after presentation of the image, the code and image marker may be sent to service center. For instance, a user may say "Code 123" as a way to start a code application and enter a code at the same time. After matching tasks are retrieved from service center and presented via device display, a user may select one by saying a task name or a number assigned to a task. It is noted that VR and AR devices may use afore-mentioned markers like location marker and time marker as well.

A user may also use gestures to launch a task. For instance, a VR or AR device may have an image sensor to monitor fingertip's position, so that a user may use finger to move a cursor on display. It may be designed that when a sensor detects a still fingertip, the position of fingertip is considered at the center of display. When the fingertip changes position, a cursor moves on display accordingly. Thus a user may let a cursor overlap a code label on an image, which may cause the label to be highlighted. Next the user may bend the finger and then straighten it quickly. Bending-and-straightening act may be designed to work as tap or click. Thus the code label may be activated, causing transmission of code and marker info to service center. When a list of tasks shows up on display, a user may move a cursor to cover one and use bending-and-straightening act again to select it.

A bidding process may be arranged at service center for the right to use code and marker combination exclusively or the right to share it with other applicants. Thus for a popular code, a bid is for a chance to share it with others. As multiple tasks are involved in a shared case, another bidding process may be arranged to decide the order of tasks, such as which task is placed at the first place and which at the second place. An applicant may pay the highest price to have a task placed on the top of list.

During registration, an applicant may submit a code, a task, and multiple markers and request combination of the code and each marker to represent the task respectively. For instance, an applicant may request to represent a task by a code and a location marker, as well as by the same code and a different marker such as another location marker.

Lastly, besides social network, code functionality may also be incorporated with other platforms, such as game program, music app, messaging interface, etc. For instance, when a user plays a game, the user may hear an ad and want to make a phone call to order a promoted service. The user doesn't need to leave the game. He or she may just tap a "Task" button on screen and enter a code in a popped up window. Then an advertised phone number is dialed automatically and the user may speak to a customer representative.

Therefore the scope of the invention should be determined by the appended claims and their legal equivalents, rather than by the examples given.

The invention claimed is:

1. A method performed for executing tasks at an electronic device, comprising:
   1) receiving a code from a user via the electronic device;
   2) the code related to a task and advertised in public;
   3) transmitting the code and time information to a service facility for a task search, the time information including a sending time at which the code is transmitted from the electronic device to the service facility;
   4) obtaining from the service facility one or more tasks and displaying the one or more tasks on a screen of the electronic device for the user to select, wherein the one or more tasks are related to the code and each arranged for a time period that covers the sending time, displaying on the electronic device an interactive icon that represents one or more other tasks that are related to the code and each of the one or more other tasks arranged for a time period that does not cover the sending time, displaying at least partially the one or more other tasks for the user to select in response to activation of the interactive icon;
   5) transmitting data comprising selection information to the service facility after the user makes a selection, wherein the selection information includes a selected task that the user selects among the one or more tasks or the one or more other tasks;
   6) receiving a message from the service facility, the message related to the selected task; and
   7) performing the selected task via the electronic device according to instructions in the message.

2. The method according to claim 1 wherein the code includes a numerical number, a letter, a mark, or a sign.

3. The method according to claim 1, further including transmitting marker information from the electronic device to the service facility for the task search, wherein the marker information is related to a place, a geographic area, an object, an entity, an image, or a video.

4. The method according to claim 1, further including providing an input space on the screen for the user to enter the code.

5. The method according to claim 1 wherein the one or more tasks include a task summary, the task summary includes a plurality of additional tasks.

6. The method according to claim 1, further including presenting on the screen one or more interactive elements, wherein the one or more interactive elements correspond to the one or more tasks respectively.

7. The method according to claim 1, further including presenting a plurality of graphic objects for the user to select, wherein the plurality of graphic objects corresponds respectively to a plurality of methods, the plurality of methods is used to present the code to the public.

8. An electronic device comprising: a processor, and a memory module coupled to the processor, the processor operable when executing certain instructions to:
   1) receive a code from a user via the electronic device;
   2) the code related to a task and advertised in public;
   3) transmit the code and time information to a service facility for a task search, the time information including a sending time at which the code is transmitted from the electronic device to the service facility;
   4) obtain from the service facility one or more tasks and display the one or more tasks on a screen of the electronic device for the user to select, wherein the one or more tasks are related to the code and each arranged for a time period that covers the sending time, display an interactive icon that represents one or more other tasks that are related to the code and each arranged for a time period that does not cover the sending time, display at least partially the one or more other tasks for the user to select in response to activation of the interactive icon;
   5) transmit data comprising selection information to the service facility after the user makes a selection, wherein the selection information includes a selected task that the user selects among the one or more tasks or the one or more other tasks;

6) receive a message from the service facility, the message related to the selected task; and 7) perform the selected task via the electronic device according to instructions in the message.

9. The electronic device according to claim 8 wherein the code includes a numerical number, a letter, a mark, or a sign.

10. The electronic device according to claim 8 wherein marker information is transmitted from the electronic device to the service facility for the task search, the marker information is related to a place, a geographic area, an object, an entity, an image, or a video.

11. The electronic device according to claim 8 wherein an input space is provided on the screen for the user to enter the code.

12. The electronic device according to claim 8 wherein the one or more tasks include a task summary, the task summary includes a plurality of additional tasks.

13. The electronic device according to claim 8 wherein one or more interactive elements are presented on the screen, the one or more interactive elements corresponding to the one or more tasks respectively.

14. The electronic device according to claim 8 wherein a plurality of graphic objects is displayed on the screen for the user to select, the plurality of graphic objects corresponds respectively to a plurality of methods, the plurality of methods is used to present the code to the public.

15. A method performed for executing tasks at an electronic device, comprising:
   1) receiving a code and time information from a user via the electronic device, the time information including a time period or a time submitted by the user, the code related to a task and advertised in public;
   2) transmitting the code and time information to a service facility for a task search;
   3) obtaining from the service facility one or more tasks and presenting the one or more tasks at the electronic device for the user to select, wherein the one or more tasks are related to the code and each arranged for a time frame that covers at least partially the time period or the time, presenting an interactive icon that represents one or more other tasks that are related to the code and each arranged for a time frame that does not cover the time period or the time, presenting at least partially the one or more other tasks for the user to select in response to activation of the interactive icon;
   4) transmitting data comprising selection information to the service facility after the user makes a selection, wherein the selection information includes a selected task that the user selects among the one or more tasks or the one or more other tasks;
   5) receiving a message from the service facility, the message related to the selected task; and
   6) performing the selected task via the electronic device according to instructions in the message.

16. The method according to claim 15 wherein the code includes a numerical number, a letter, a mark, or a sign.

17. The method according to claim 15, further including transmitting marker information from the electronic device to the service facility for the task search, wherein the marker information is related to a place, a geographic area, an object, an entity, an image, or a video.

18. The method according to claim 15 wherein the one or more tasks include a task summary, the task summary includes a plurality of additional tasks.

19. The method according to claim 15, further including presenting one or more interactive elements at the electronic device, wherein the one or more interactive elements correspond to the one or more tasks respectively.

20. The method according to claim 15, further including presenting a plurality of graphic objects at the electronic device for the user to select, wherein the plurality of graphic objects corresponds respectively to a plurality of methods, the plurality of methods is used to present the code to the public.

* * * * *